(12) United States Patent
Petrescu et al.

(10) Patent No.: US 11,500,763 B1
(45) Date of Patent: Nov. 15, 2022

(54) DISTRIBUTED CANARY TESTING WITH TEST ARTIFACT CACHING

(71) Applicant: Amazon Technologies, Inc., Seattle, WA (US)

(72) Inventors: Mihaela Petrescu, Seattle, WA (US); Yan Peng, Redmond, WA (US); Sahar Zeineddine, Shoreline, WA (US); Nikhil Ravishankar, Seattle, WA (US); Adithya Venkatesh, Sydney (AU)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 16/831,655

(22) Filed: Mar. 26, 2020

(51) Int. Cl.
```
G06F 9/44     (2018.01)
G06F 11/36    (2006.01)
G06F 9/54     (2006.01)
```

(52) U.S. Cl.
CPC .......... *G06F 11/3688* (2013.01); *G06F 9/541* (2013.01); *G06F 11/368* (2013.01); *G06F 11/3692* (2013.01)

(58) Field of Classification Search
CPC .... G06F 9/541; G06F 11/368; G06F 11/3688; G06F 11/3692
USPC ........................................................ 717/125
See application file for complete search history.

(56) References Cited

U.S. PATENT DOCUMENTS

| | | | |
|---|---|---|---|
| 5,978,936 A * | 11/1999 | Chandra | H04L 43/50 714/25 |
| 8,677,320 B2 | 3/2014 | Wilson et al. | |
| 8,782,606 B1 * | 7/2014 | Cohen | G06F 8/30 717/124 |
| 8,997,053 B2 | 3/2015 | Yanes | |
| 9,069,901 B2 | 6/2015 | Varadharajan | |
| 9,274,933 B2 | 3/2016 | Hess et al. | |
| 9,627,000 B1 | 4/2017 | Gardner et al. | |
| 9,661,014 B2 | 5/2017 | Shafigullin et al. | |
| 9,996,454 B1 * | 6/2018 | Greer | G06F 11/3672 |
| 10,255,163 B2 | 4/2019 | Gardner et al. | |
| 10,678,666 B1 * | 6/2020 | Gauf | G06F 11/2635 |
| 11,182,273 B1 * | 11/2021 | Bell | G06F 11/368 |
| 11,360,881 B2 * | 6/2022 | Gardner | G06F 11/3419 |

(Continued)

OTHER PUBLICATIONS

Generating tests from UML specifications, author: J Offutt et al, published on 1999.*

(Continued)

*Primary Examiner* — Chameli Das
(74) *Attorney, Agent, or Firm* — Robert C. Kowert; Rankin & Goetzel, P.C.

(57) ABSTRACT

Methods, systems, and computer-readable media for distributed canary testing with test artifact caching are disclosed. Using one or more storage components, a test client stores one or more software artifacts for testing of a software product. The client initiates a first test of the software product using the software artifact(s) stored in the storage component(s). In the first test, the client sends a first set of requests to the software product at a first point in time. The client initiates a second test of the software product using the software artifact(s) stored in the storage component(s). In the second test, the client sends a second set of requests to the software product at a second point in time. The software artifact(s) are maintained in the storage component(s) between the first point in time and the second point in time.

19 Claims, 7 Drawing Sheets

(56) References Cited

U.S. PATENT DOCUMENTS

| | | | |
|---|---|---|---|
| 2003/0167423 A1* | 9/2003 | Murakami | G06F 11/368 714/38.14 |
| 2004/0088682 A1* | 5/2004 | Thompson | G06F 12/0802 717/124 |
| 2007/0266283 A1* | 11/2007 | Balakrishnan | G01R 31/318547 714/726 |
| 2014/0026120 A1* | 1/2014 | Gu | G06F 11/3684 717/124 |
| 2014/0059387 A1* | 2/2014 | McMahan | G06F 3/0481 714/33 |
| 2014/0325486 A1* | 10/2014 | Zhang | G06F 11/3692 717/125 |
| 2015/0195181 A1* | 7/2015 | Birmiwal | H04L 43/50 709/224 |
| 2016/0210226 A1* | 7/2016 | Hall | G06F 11/3692 |
| 2017/0178684 A1* | 6/2017 | Gardner | G11B 27/36 |
| 2018/0081775 A1* | 3/2018 | Powell | H04W 4/70 |
| 2018/0189168 A1* | 7/2018 | Dwarakanath | G06F 11/3684 |
| 2018/0239692 A1* | 8/2018 | Kalyanasundram | G06F 11/273 |
| 2021/0081294 A1* | 3/2021 | Golubev | G06F 11/3664 |

OTHER PUBLICATIONS

An object-oriented web test model for testing web applications ; author: DC Kung et al, published on 2000.*

Title: Automated generation of test cases using model-driven architecture, author: AZ Javed, published on 2007.*

Title: The role of experience in software testing practice, author: A Beer, published on 2008.*

The influence of multiple artifacts on the effectiveness of software testing, author: M Staats published on 2010.*

Title: Which Test Artifacts Testing Service Providers should Reuse and How? Experiences from a Case Study in the Chinese ICT Sourcing Market, autor: Y Lu et al, published on 2011.*

Cyrille Martraire, "Canary Test", Retrieved from https://www.javacodegeeks.com/2014/02/canary-tests.html on Feb. 26, 2020, Feb. 2014, pp. 1-4.

* cited by examiner

DISTRIBUTED CANARY TESTING WITH TEST ARTIFACT CACHING

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Complex systems may include many services that interact with one another in a variety of ways.

Automated testing of such services is an increasingly important part of the software development process. A suite of automated tests may be run to verify the expected operation of software. In some circumstances, tests referred to as canary tests may be used to verify the proper functioning of production software. Canary tests may be performed repeatedly over time to mimic customer behavior with respect to the software. Canary tests may be used for early identification of problems with the software.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for distributed canary testing with test artifact caching are described. To perform canary testing to ensure the proper functioning of a software product, a distributed set of clients may periodically test the software by mimicking real-world customer behavior. For example, a particular client may run a test every ten seconds by sending one or more client requests to one or more application programming interfaces (APIs) offered by a service hosted in the cloud. Canary tests may represent a "canary in a coal mine" intended to quickly detect flaws, errors, or other problems with a software product before such problems cause a widespread outage or disruption. Canary tests may be used instead of or prior to more expensive and time-consuming tests such as end-to-end tests. A particular test client may perform canary tests again and again over some period of time, e.g., as long as the software product is deployed to production.

A canary test initiated by a test client may require a set of test artifacts to run as intended. Test artifacts may vary according to the software being tested. Test artifacts may include code packages, function libraries, configuration files, parameter values, test schedules, and/or other software dependencies and components. A test client may acquire one or more of the test artifacts via a network connection to one or more artifact sources, e.g., code package repositories, storage services, a distributed testing coordinator, and so on. Acquisition of the required test artifact(s) may take time and consume network bandwidth. Using some prior approaches for canary testing, test artifacts were not necessarily retained at a given test client from one test to another test. Accordingly, the test client would have needed to reacquire one or more test artifacts before initiating a later test, thus consuming additional network bandwidth and delaying the start of a scheduled test. For example, if canary tests were performed by executing functions using a serverless compute service, then the state associated with one test (including some or all of the required test artifacts) may have been discarded before the next test was run. To ensure that canary tests can be initiated according to a predetermined schedule while also conserving use of network resources, one or more test artifacts may be cached at test clients. Caching of test artifacts may include keeping the artifacts in storage (e.g., persistent storage such as hard disks and/or volatile storage such as random access memory, and so on) that is locally accessible to a given test client between one test and a subsequent test. By reusing cached test artifacts for multiple tests without reacquiring the artifacts from their original sources via a network, a client may be able to follow a testing schedule more closely.

As one skilled in the art will appreciate in light of this disclosure, embodiments may be capable of achieving certain improvements to computer technology, including some or all of the following technical effects: (1) improving the scheduling precision of automated software testing by locally caching test artifacts and reducing the need to reacquire artifacts for canary tests; (2) reducing the network usage associated with automated software testing by locally caching test artifacts and reducing the need to reacquire artifacts for canary tests; (3) reducing the performance impact of automated software testing by selectively testing infrequently used application programming interfaces (APIs) rather than a larger set of APIs; (4) improving the reliability of automated software testing by implementing test clients across multiple regions of a provider network; (5) increasing the transactions per second (TPS) of automated software testing using a serverless compute service by performing multiple tests per function execution; and so on.

Figure 1:
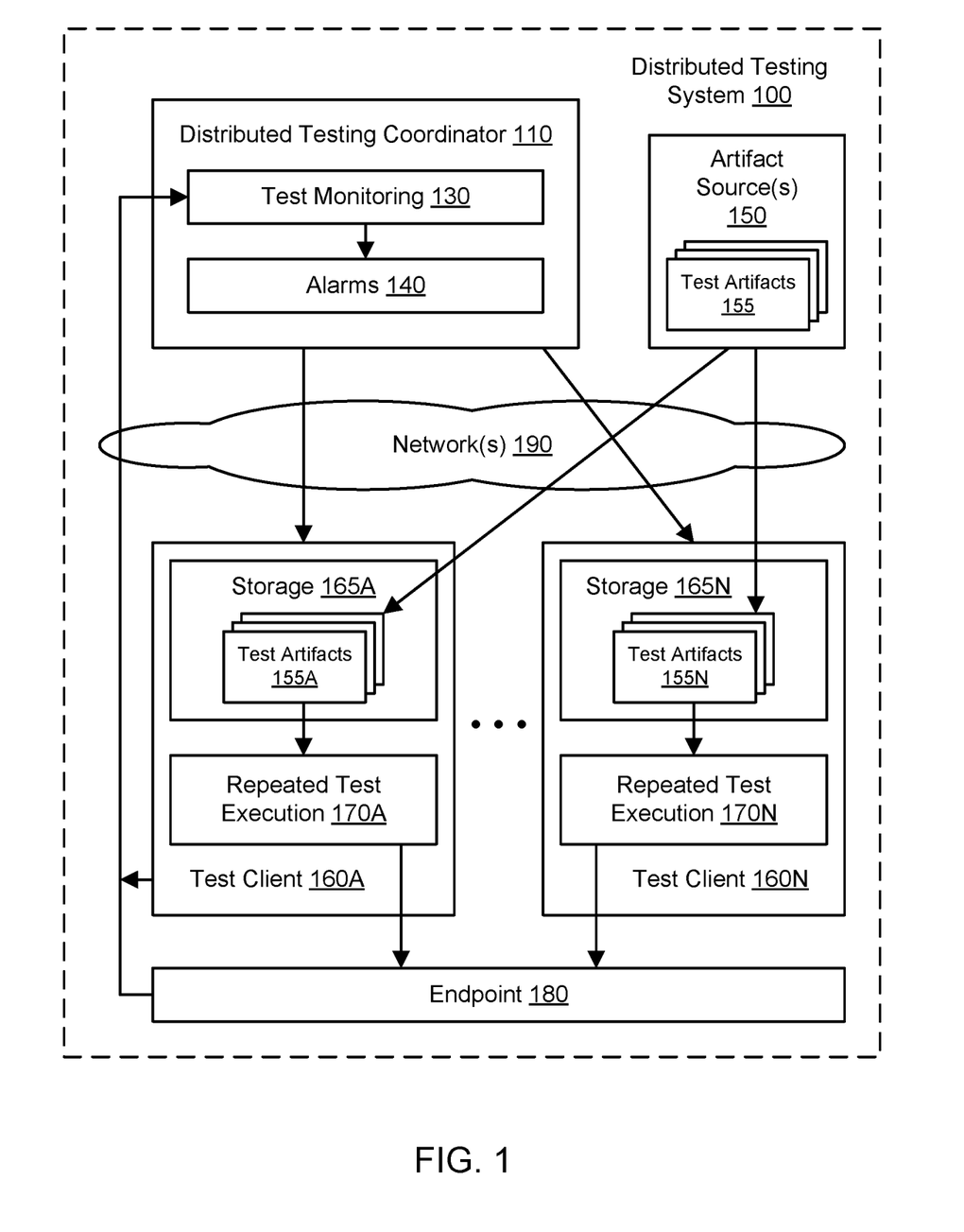
FIG. 1 illustrates an example system environment for distributed canary testing with test artifact caching, according to some embodiments.

FIG. 1 illustrates an example system environment for distributed canary testing with test artifact caching, according to some embodiments. A distributed testing system 100 may use a distributed set of test clients 160A-160N to test the functionality of a particular service, application, or other software product deployed to an endpoint 180. The terms "service" and "endpoint" may be used interchangeably herein. The service 180 may perform tasks on behalf of clients and upon invocation by client requests. For example, the service 180 may store a requested object in a requested storage location based on a request to a particular API offered by the service. The service 180 may be implemented in an execution environment such as a test environment, a development environment, a pre-production environment, or a production environment. The test clients 160A-160N may include servers or hosts, containers, and/or instances of a serverless compute service that are used for initiating or performing automated testing of the service 180. Aspects of the distributed testing may be managed by a centralized component such as a distributed testing coordinator 110. For example, the coordinator 130 may set testing schedules for individual test clients, monitor the results of tests, and/or raise alarms when tests detect problems with the service 180.

The distributed testing system 100 may perform canary testing of a service at one or more endpoints such as endpoint 180. Distributed canary testing may use a set of test clients 160A-160N to mimic customer behavior with respect to a service, application, application programming interface (API), or other software product at an endpoint 180. A canary test may include sending one more client requests to a service 180 under test, where the requests seek to invoke the functionality provided by the service. Canary tests may represent a "canary in a coal mine" intended to quickly detect flaws, errors, or other problems with a software product 180 before such problems cause a widespread outage or disruption. Canary tests may be used instead of or prior to more expensive and time-consuming tests such as end-to-end tests. In some embodiments, canary tests may represent tests to verify a minimum of functionality of a software product 180. For example, if a service 180 stores objects using cloud-hosted storage, then canary testing may send requests for object storage to the service. Canary tests may check frequent sources of problems, e.g., network connectivity issues, database and middleware availability, disk quota issues, access credentials, software versioning, data integrity and consistency, license expiration, and so on. In some embodiments, canary testing may be performed automatically and repeatedly after an initial configuration phase. For example, each test client of a set of clients 160A-160N may be configured to perform a canary test (e.g., by sending one or more requests to the service 180) every ten seconds. In some embodiments, canary testing may be performed for software products deployed to a production environment (and thus configured to interact with real-world customers) to verify that aspects (e.g., APIs) of the software are meeting a minimum standard of functionality. Canary testing may continue for an indefinite duration. In some embodiments, canary testing may be performed automatically and repeatedly until the testing reveals a flaw, error, or other problem with the software product 180.

A canary test initiated by a test client may require a set of test artifacts to run as intended. Test artifacts may vary according to the software being tested. Test artifacts may include code packages, function libraries, configuration files, parameter values, test schedules, and/or other software dependencies and components. A test client may acquire one or more of the test artifacts 155 from one or more artifact sources 150. Artifact source(s) 150 may include, for example, code package repositories, storage services, the distributed testing coordinator 110, and so on. Acquisition of the required test artifact(s) 155 may take time and consume network bandwidth of one or more network(s) 190. If test artifact(s) 155 need to be acquired for each test, then network resources may be consumed, and initiation of the tests may be delayed.

To ensure that canary tests can be initiated according to a predetermined schedule while also conserving use of one or more networks 190, one or more test artifacts 155 may be cached at test clients 160A-160N. Caching of one or more test artifacts may include maintaining the artifact(s) in storage that is locally accessible to a given test client between one test and a subsequent test. As shown in FIG. 1, one or more test artifacts 155A may be acquired once by the test client 160A from artifact source(s) 150 over the network(s) 190, stored in one or more local storage resources 165A associated with the test client 160A, and reused for repeated test execution 170A at the test client 160A without reacquiring the artifact(s) over the network(s) 190. Similarly, one or more test artifacts 155N may be acquired once by the test client 160N from artifact source(s) 150 over the network(s) 190, stored in one or more local storage resources 165N associated with the test client 160N, and reused for repeated test execution 170N at the test client 160N without reacquiring the artifact(s) over the network(s) 190. The local storage 165A and 165N may include persistent or nonvolatile storage such as hard disk drives or solid-state drives, volatile storage such as random access memory, storage accessible by the test client over a local bus, and so on. By reusing cached test artifacts for multiple tests without reacquiring the artifacts from their original sources via a network, a test client may be able to follow a testing schedule more closely.

The repeated test execution 170A-170N may generate and send requests to the endpoint 180, e.g., over the network(s) 190. The requests may mimic the behavior of real-world customers of the service deployed to the endpoint 180. For example, if the service 180 dynamically generates components of web pages associated with an online store, then the test execution 170A-170N may provide requests for such web page components. The response of the endpoint 180 to the test execution 170A-170N may be monitored using a component 130 for test monitoring. The test monitoring 130 may seek to detect errors, flaws, unexpected results, performance not meeting service-level agreements (SLAs), and/or other problems surfaced by the distributed testing. For example, if requests generated by the test execution 170A-170N tend to produce errors at the endpoint 180, then the test clients 160A-160N may detect such errors via responses from the endpoint 180 (or from the lack of such responses within a predetermined time threshold). The clients 160A-160N and/or endpoint 180 may provide monitoring data to the test monitoring 130. The monitoring data may indicate requests that were not processed successfully, requests that were processed but beyond an acceptable time limit, and/or other indicia of erroneous or poor performance by the service 180.

The coordinator 110 may take one or more actions based (at least in part) on the test monitoring 130. For example, the coordinator 110 may raise one or more alarms 140 or generate reports. Alarms or reports may indicate particular problems that were detected by the automated software testing. For example, alarms or reports may indicate the particular API for which a problem was found, the time at which the problem was found, the nature of the problem, and so on. Alarms may be raised in a management console associated with the tested endpoint 180 or send to relevant developers or managers of the service. A report may be stored to a storage location, sent to a relevant user (e.g., a developer of the service 180), and/or displayed in a user interface accessible by a developer of the program code. In some embodiments, alarms 140 may be configured to be checked every M minutes, while canary tests may be performed every N seconds. Because alarms may be triggered less often than tests are performed, it is beneficial for the distributed testing to maintain a schedule for generating canary tests. If tests are performed too infrequently and/or not according to a predetermined schedule, then errors may go undetected for a longer period of time.

In one embodiment, the functionality of the system 100 as discussed herein may be provided to clients as a distributed testing service. The distributed testing service, tested service 180, test clients 160A-160N, coordinator 110, and/or artifact source(s) 150 may be implemented in a provider network. The distributed testing service may assess fees to clients for tasks associated with distributed testing, e.g., the test monitoring 130. The provider network may represent a network operated by an entity such as a business or a public-sector organization to provide one or more services and other computing resources (such as various types of cloud-based computing or storage) accessible via the Internet and/or other networks to a distributed set of clients. The provider network may include numerous data centers hosting various services and resource pools of computing resources, such as collections of physical and/or virtualized computer servers, storage devices, networking equipment and the like, that are used to implement and distribute the infrastructure and services offered by the provider. Resources of the provider network may be hosted in "the cloud," and the provider network may be termed a cloud provider network. The provider network may offer some resource pools and services to multiple clients simultaneously and may thus be termed "multi-tenant." The computing resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). The provider network may offer a set of services whose functionality can be invoked by clients internal or external to the provider network. For example, the services may include "serverless" computing solutions that allocate and manage servers and hosts on behalf of clients, e.g., to execute client-specified functions. A number of different types of computing devices may be used singly or in combination to implement the resources of the provider network in different embodiments, including general purpose or special purpose computer servers, storage devices, network devices, and so on.

In one embodiment, the nature of the test execution 170A-170N may be determined based (at least in part) on user input. For example, a developer associated with the software product 180 may supply or indicate tests that she or he deems to be relevant to the software product, e.g., canary tests or load tests. Individual tests in a test suite may be configured with suitable parameters. In general, a test suite may include performance tests such as sanity tests, latency tests, and/or load tests for scalability and throughput. Each test may be associated with an acceptable range of results, such that results outside the acceptable range may constitute a failure for that particular test. In one embodiment, the tests may include integration tests, e.g., tests in which the test host(s) do access other systems over a network.

Figure 7:
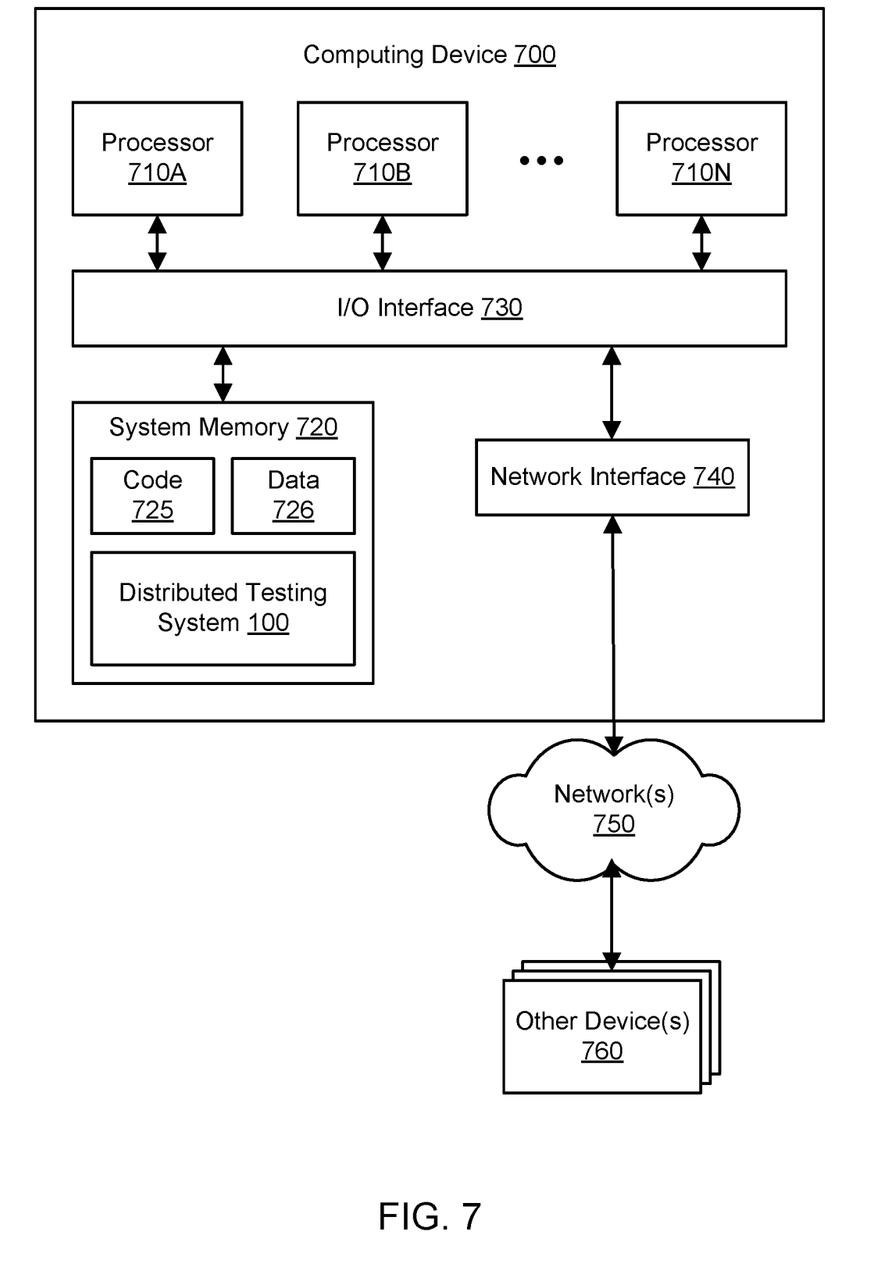
FIG. 7 illustrates an example computing device that may be used in some embodiments.

The test execution 170A-170N by the test clients 160A-160N may be performed by computing resources such as the example computing device 700 illustrated in FIG. 7. In one embodiment, the testing may be initiated on a fleet of test hosts. In one embodiment, the test execution 170A-170N may be implemented using a serverless compute service that manages its own computing resources to execute programs or functions on behalf of clients. In one embodiment, the test execution 170A-170N may be implemented within containers.

In some embodiments, the software product at the endpoint 180 may be tested in a test environment. The test environment may include various modules, components, or functionalities to implement testing of software product 180 according to tests in a test suite and/or according to canary tests. The test environment may be used to test a software product at build time, deployment time, or any other suitable time in the development cycle. The test environment may be part of a testing framework that is available to developers of various types of software product. For example, software products to be tested using the test environment may include services that collaborate with other services according to a service-oriented architecture. The distributed testing may itself be implemented as a service whose functionality can be invoked by clients (including end users and/or other services) via a programmatic interface or user interface. In one embodiment, aspects of the distributed testing may be activated as part of a deployment pipeline for deploying a software product to a production environment. In one embodiment, aspects of the distributed testing may be part of or invoked by a continuous integration system or continuous deployment system. For example, program code for the software product 180 may be stored by a managed source-control service that hosts repositories. Using an automated pipeline management service, the program code may be built, tested, and deployed for every code change or according to other triggers. The tests and/or deployment to production may be performed automatically as part of such a pipeline.

In one embodiment, the tests may be executed in a test environment in which the software product may be insulated from real-time interaction with real-world clients, e.g., by processing only synthetic requests or prerecorded client requests that were previously captured in a production environment. For example, if the software product 180 implements a service that is associated with an electronic commerce (e-commerce) store, then the service may be configured to perform one or more suitable operations such as generating a web page (e.g., a product description page for a product offered for sale by the store), completing a sale or other transaction between the store and a customer, verifying a payment presented by the customer, etc.

In some embodiments, the software product at the endpoint 180 may be tested in a production environment in which the software product may interact with real-world clients. A production environment may include various modules, components, or functionalities to implement execution of a software product 180 as the software product interacts with clients. Testing in a production environment may represent integration testing, end-to-end testing, or system testing, whereas execution in a test environment may often be restricted to unit testing. In the production environment, the software product 180 may be executed according to requests from real-world clients as well as requests from test clients 160A-160N. Real-world clients may include external entities and/or other services in a service-oriented system whose functionality is invoked directly or indirectly by external entities. For example, if the software product 180 provides a portion of a dynamically generated web page, then the software product may be invoked by a request from a page-building service of a web server, which may in turn be invoked by a request from a client of the web server.

It is contemplated that the system 100 may include additional components not shown, fewer components than shown, or different combinations, configurations, or quantities of the components shown. The system 100 may comprise one or more computing devices, any of which may be implemented by the example computing device 700 illustrated in FIG. 7. In various embodiments, portions of the system 100 may be provided by the same computing device or by any suitable number of different computing devices. If any of the components of the system 100 are implemented using different computing devices, then the components and their respective computing devices may be communicatively coupled, e.g., via a network 190. Each of the illustrated components may represent any combination of software and hardware usable to perform their respective functions. It is contemplated that operations performed by the system 100 may be invoked based (at least in part) on initial user input, e.g., through a user interface or API. However, beyond the invocation of the system 100, aspects of the functionality of the system may be performed in an automated manner without soliciting input from a user associated with the software product under analysis.

Components of the system 100 may convey network-based service requests to one another via one or more networks 190. In various embodiments, the network(s) 190 may encompass any suitable combination of networking hardware and protocols necessary to establish network-based communications between components. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, two different components may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given component and the Internet as well as between the Internet and another component. It is noted that in some embodiments, components may communicate using a private network rather than the public Internet.

Figure 2:
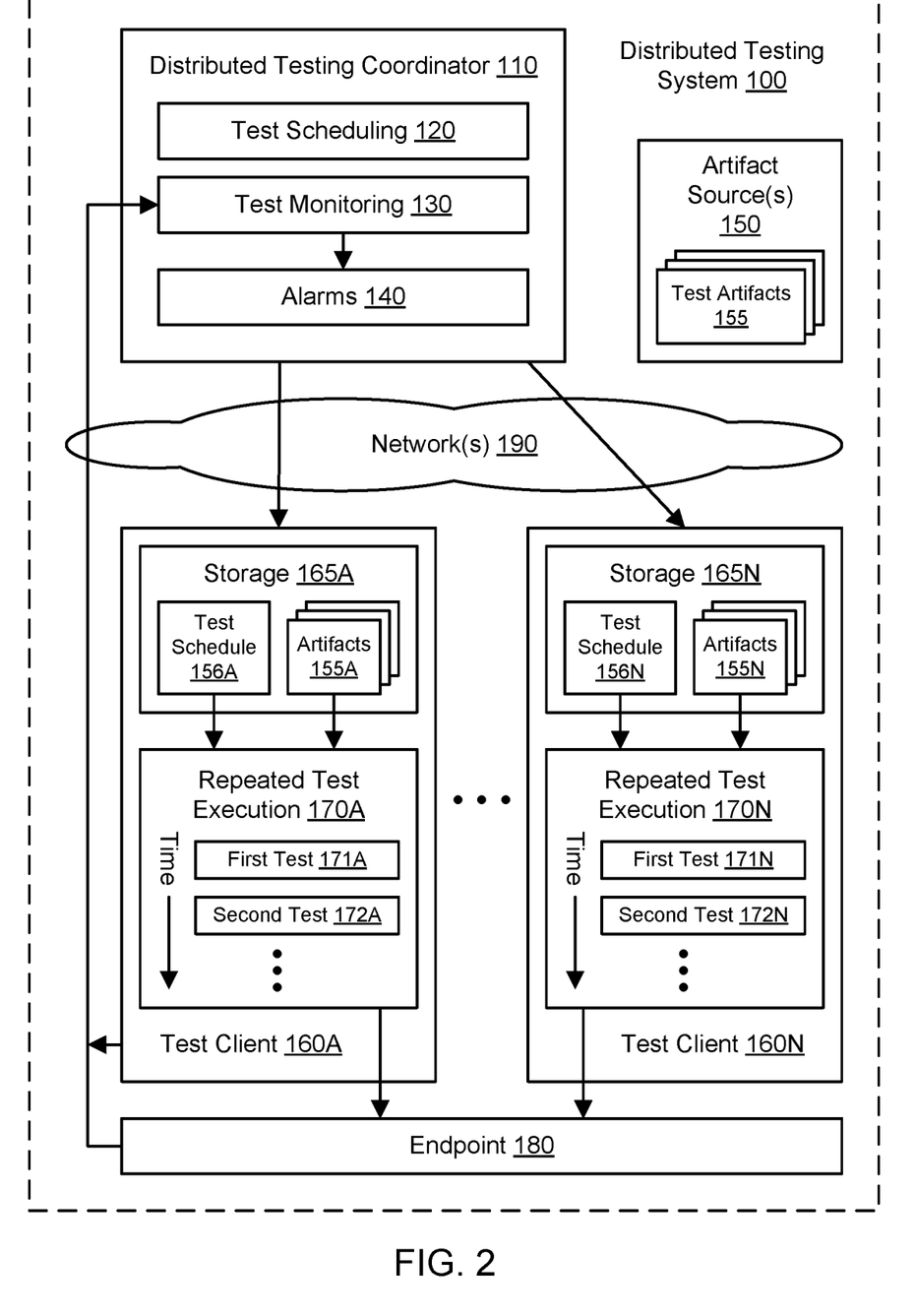
FIG. 2 illustrates further aspects of the example system environment for distributed canary testing with test artifact caching, including repeated test execution according to a schedule, according to some embodiments.

FIG. 2 illustrates further aspects of the example system environment for distributed canary testing with test artifact caching, including repeated test execution according to a schedule, according to some embodiments. As discussed above, the test execution 170A-170N may be performed repeatedly over time, e.g., as long as the service at the endpoint 180 is deployed to production. In some embodiments, the coordinator 110 may include a component 120 for test scheduling. The test scheduling 120 may seek to initiate tests (e.g., canary tests) at specific times according to a schedule. The test scheduling 120 may be performed with respect to individual test clients or the fleet of test clients 160A-160N for a tested service 180. The test scheduling 120 may generate test schedules that are provided to individual test clients 160A-160N. As shown in FIG. 2, the coordinator 110 may provide the test schedule 156A to the test client 160A and the test schedule 156N to the test client 160N. The test schedules 156A-156N may be stored in the local storage resources 165A-165N, e.g., along with the test artifacts 155A-155N. In some embodiments, test schedules 156A-156N may be deemed test artifacts as well. A test schedule for a particular test client may seek to initiate tests at minute or sub-minute intervals, e.g., every ten seconds per client. If all the clients 160A-160N follow their respective schedules, then the distributed canary testing can meet a desired throughput (e.g., in transactions per second provided to the endpoint 180). However, if one or more of the clients 160A-160N depart from their respective schedules, then the distributed canary testing may fail to meet a desired throughput, and the ability of the canary testing to detect problems in a timely manner may be diminished.

Using the cached test artifacts, the repeated test execution 170A-170N may be performed according to the test schedules 156A-156N. For example, at the test client 160A, the repeated test execution 170A may initiate a first test 171A at one point in time and a second test 172A at a later point in time according to the schedule 156A. The first test 171A and second test 171N may both use the stored artifact(s) 155A without re-downloading the artifacts from the source(s) 150. Similarly, at the test client 160N, the repeated test execution 170N may initiate a first test 171N at one point in time and a second test 172N at a later point in time according to the schedule 156N. The first test 171N and second test 171N may both use the stored artifact(s) 155N without re-downloading the artifacts from the source(s) 150. By reusing cached test artifacts for multiple tests reacquiring the artifacts from their original source(s) 150 via a network 190, a client may be able to follow a testing schedule more closely by eliminating delays associated with downloading artifacts. Additionally, the client may reduce use of the network(s) 190.

Figure 3:
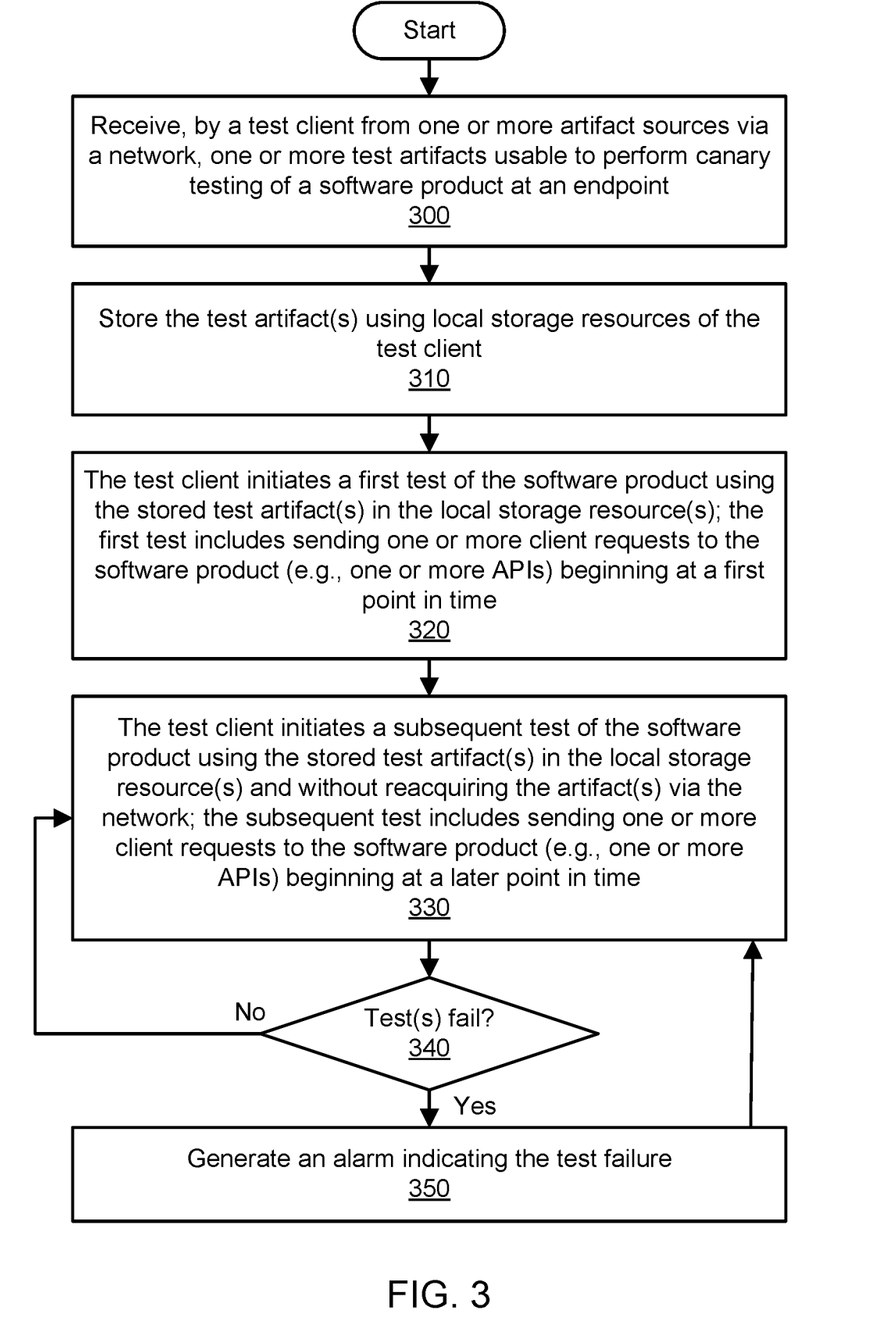
FIG. 3 is a flowchart illustrating a method for distributed canary testing with test artifact caching, according to some embodiments.

FIG. 3 is a flowchart illustrating a method for distributed canary testing with test artifact caching, according to some embodiments. A shown in 300, a particular test client (of a fleet of test clients) may receive one or more test artifacts. Test artifacts may include code packages, function libraries, configuration files, parameter values, test schedules, and/or other software dependencies and components. The test artifact(s) may be received from one or more artifact sources via a network. Artifact source(s) may include, for example, code package repositories, storage services, a distributed testing coordinator, and so on. The test artifact(s) may be usable to perform canary testing of a software product. Distributed canary testing may use a set of test clients to mimic customer behavior with respect to a service, application, application programming interface (API), or other software product. A canary test may include sending one more client requests to a service under test, where the requests seek to invoke the functionality provided by the service. Canary tests may represent a "canary in a coal mine" intended to quickly detect flaws, errors, or other problems with a software product before such problems cause a widespread outage or disruption. Canary tests may be used instead of or prior to more expensive and time-consuming tests such as end-to-end tests. In some embodiments, canary tests may represent tests to verify a minimum of functionality of a software product.

As shown in 310, the test artifact(s) may be cached or otherwise stored using one or more local storage resources of the test client. To ensure that canary tests can be initiated according to a predetermined schedule while also conserving use of one or more networks, one or more test artifacts may be cached at the test client and maintained in the local storage from one test to the next. The local storage may include persistent or nonvolatile storage such as hard disk drives or solid-state drives, volatile storage such as random access memory, storage accessible by the test client over a local bus, and so on.

As shown in 320, the test client may initiate a first test of the software product using the test artifact(s) stored in the local storage. The first test may include generating and sending one or more client requests to the software product to invoke functionality of the software product. For example, the client requests may be sent to a particular API of the software product. The first test may begin at a first point in time, e.g., according to a schedule.

As shown in 330, the test client may initiate a subsequent (e.g., second) test of the software product using the test artifact(s) stored in the local storage. The cached artifact(s) may be retrieved from local storage reused for the subsequent test(s) at the test client without reacquiring the artifact(s) over the network. The subsequent test may include generating and sending another one or more client requests to the software product to again invoke functionality of the software product. For example, the additional client requests may be sent to the particular API of the software product. The subsequent test may begin at a later point in time than the first point in time, e.g., according to the schedule.

As shown in 340, the method may determine whether any of the tests failed. The response of the service to the tests may be monitored to detect errors, flaws, unexpected results, performance not meeting service-level agreements (SLAs), and/or other problems surfaced by the distributed testing. For example, the test client may use responses from the service (or the lack of such responses within a predetermined time threshold) to detect requests that were not processed successfully, requests that were processed but beyond an acceptable time limit, and/or other indicia of erroneous or poor performance by the service. If test failure was not detected, then the testing may continue as shown in 330. If test failure was detected, then as shown in 350, the method may generate an alarm or report indicating the test failure. In some embodiments, a developer of the software product may choose to address the test failure, e.g., by rolling back the deployed service to a prior version, by deploying an updated version, and so on. In some embodiments, testing may continue as shown in 330 even after detection of a test failure.

Figure 4:
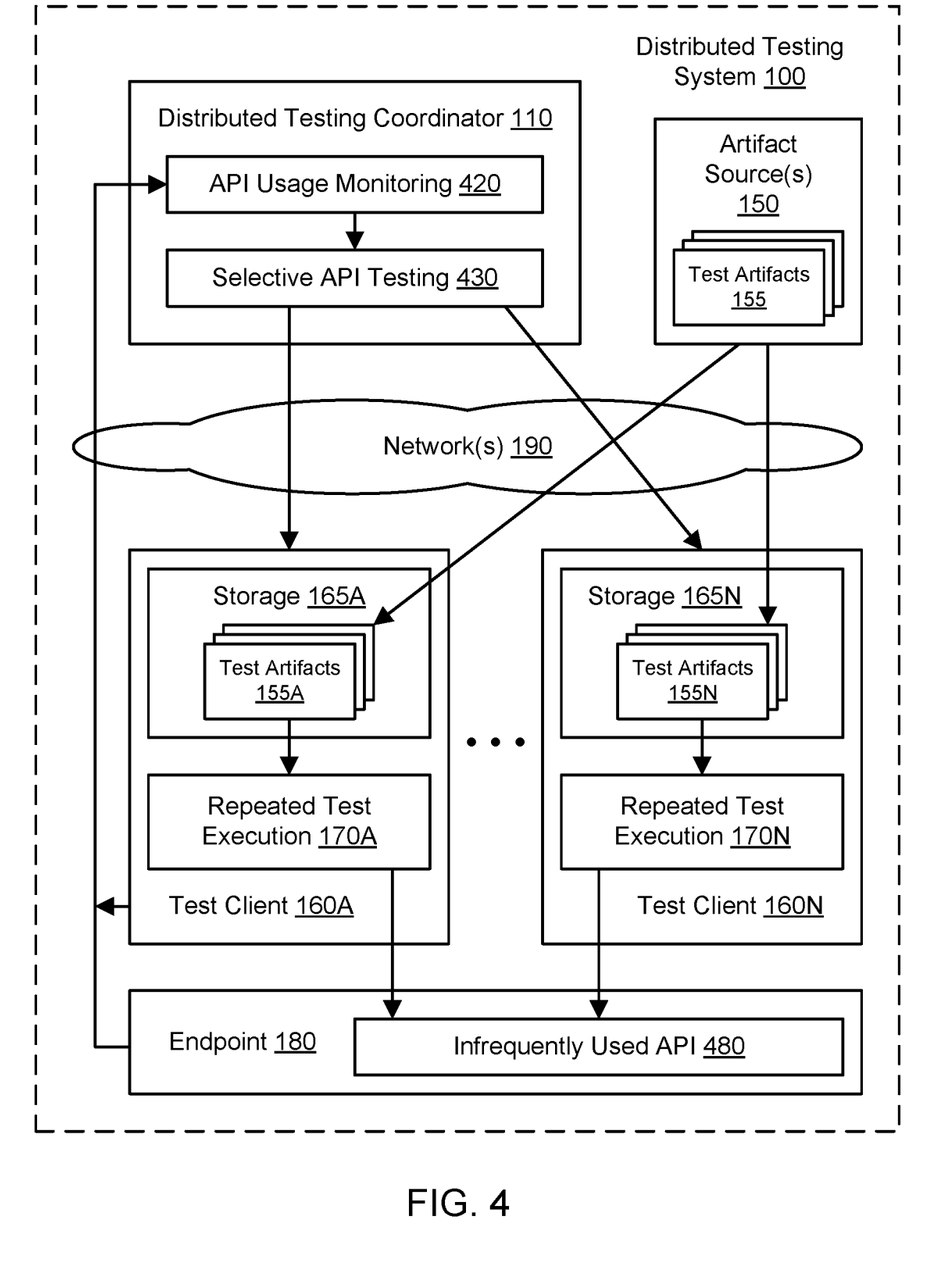
FIG. 4 illustrates further aspects of the example system environment for distributed canary testing with test artifact caching, including selective testing of infrequently used application programming interfaces (APIs), according to some embodiments.

FIG. 4 illustrates further aspects of the example system environment for distributed canary testing with test artifact caching, including selective testing of infrequently used application programming interfaces (APIs), according to some embodiments. The execution of canary tests may be associated with performance costs and resource usage, e.g., by using network bandwidth for canary requests and responses and also by using computational resources of the clients 160A-160N and endpoint 180. However, canary testing may be necessary for some APIs to generate enough traffic to trigger some alarms, particularly for alarms that are percentage-based. To minimize the performance impact and/or cost of canary testing, the distributed testing coordinator 110 may include a component 420 for API usage monitoring and a component 430 for selective API testing. The API usage monitoring 420 may determine the frequency at which APIs of the tested endpoint 180 are invoked by real-world customers. Based on this API usage data, the selective API testing 430 may initiate canary testing for some APIs but not other APIs in order to conserve resources while providing enough data for alarms. For example, if a particular API is exercised by customers at a sufficiently high rate, then the developer of the service 180 may assume that problems with that API will surface relatively soon and without incurring the expense and resource usage of canary testing. However, if another API 480 is used relatively infrequently by real-world customers, the canary testing may be more likely to surface problems with that API than real-world traffic alone. The selective API testing 430 may configure the test clients 160A-160N to perform canary testing of the infrequently used API 480 but not canary testing of more frequently used APIs of the same endpoint 180.

Figure 5:
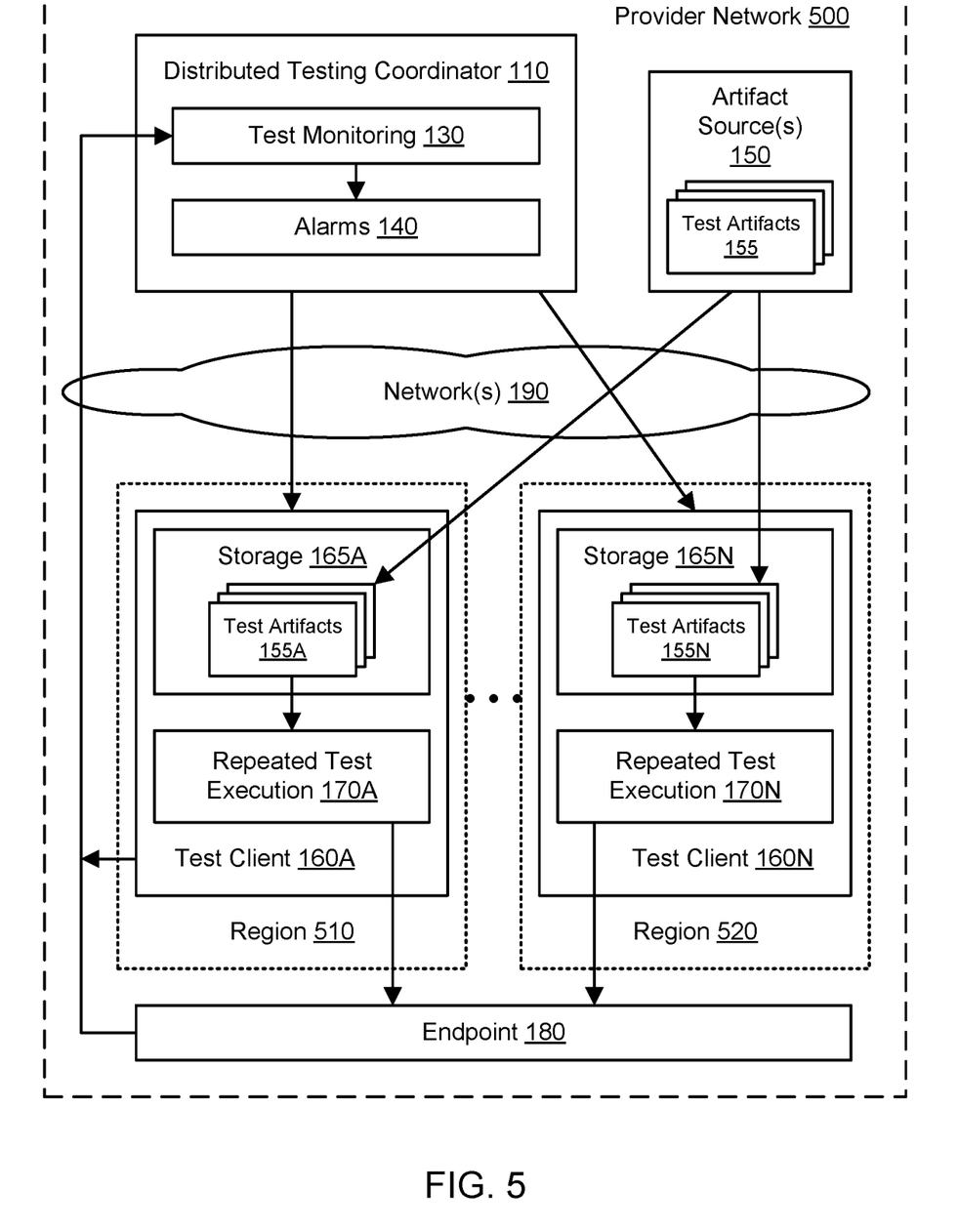
FIG. 5 illustrates further aspects of the example system environment for distributed canary testing with test artifact caching, including cross-region testing, according to some embodiments.

FIG. 5 illustrates further aspects of the example system environment for distributed canary testing with test artifact caching, including cross-region testing, according to some embodiments. As discussed above, aspects of the system 100 may be implemented in a multi-tenant, cloud-based provider network 500. The provider network 500 may include a plurality of regions. Different regions may represent different geographical areas and/or political boundaries. For example, one region 510 may represent the East Coast of the United States, while another region 520 may represent the West Coast of the United States. Both of the regions 510 and 520 may offer similar types of services and resources. However, the computing resources, storage resources, network resources, and infrastructure of the region 510 may largely be independent of that of the other region 520. To improve the reliability of the distributed testing, the distributed testing coordinator 110 may configure test clients 160A-160N across multiple regions (e.g., regions 510 and 520) of the provider network 500 for canary testing of the same service 180. The service 180 may be represented by service instances in one or more the various regions. If canary testing cannot be originated from one region, but canary testing in the other region remains viable, then the continued functioning of the service 180 may be verified even through the single-region outage.

Figure 6:
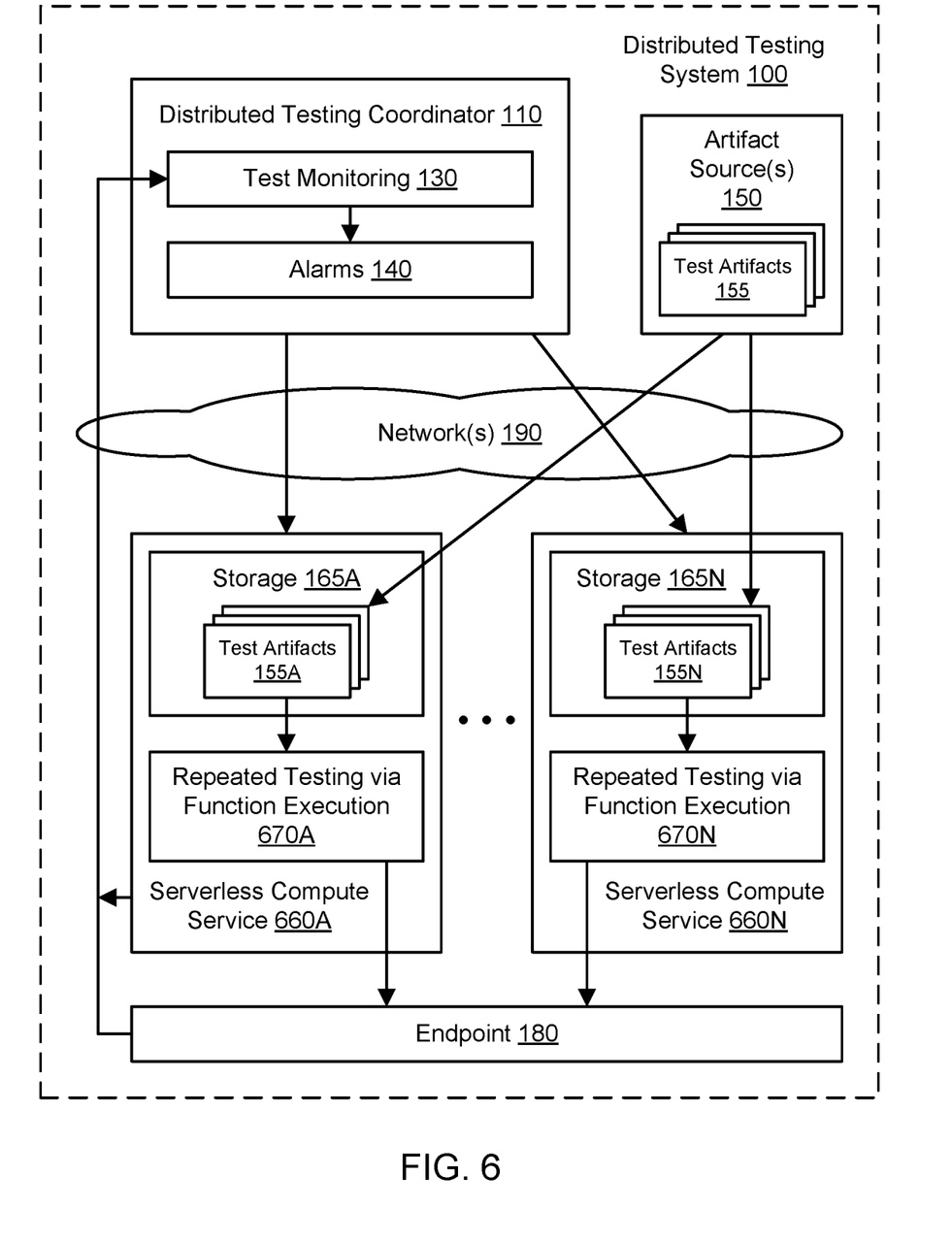
FIG. 6 illustrates further aspects of the example system environment for distributed canary testing with test artifact caching, including the use of a serverless compute service for testing, according to some embodiments.

FIG. 6 illustrates further aspects of the example system environment for distributed canary testing with test artifact caching, including the use of a serverless compute service for testing, according to some embodiments. In one embodiment, the test execution 170A-170N may be implemented using a serverless compute service that manages its own computing resources to execute programs or functions on behalf of clients. The serverless compute service may be hosted in the cloud-based provider network and may execute client-specified functions. In some embodiments, the client-specified functions may be used to generate and send tests to a service 180 for purposes of canary testing. As shown in the example of FIG. 6, aspects of the test client 160A as discussed above may be implemented using a first instance or first function execution 660A of a serverless compute service. As also shown in the example of FIG. 6, aspects of the test client as discussed above 160N may be implemented using a second instance or second function execution 660N of the serverless compute service.

In prior approaches for using the serverless compute service, the state was typically not maintained from one function execution to the next function execution. To reduce the need to reacquire one or more test artifacts for every canary test at the serverless compute service, the test artifact(s) may be cached and reused from one test to another test using the serverless compute service. In some embodiments, one function execution 670A or 670N may be initiated for generating a first test, placed into an idle state for some duration of time, used again for generating a second test according to the desired testing interval, idled again, and so on. In some embodiments, the same function execution 670A or 670N may be used for repeated canary testing until a time limit of the serverless compute service is reached. In some embodiments, the artifacts 155A or 155N may be specified using a "to be cached" parameter of the serverless compute service so that they can be stored and reused for repeated testing without being reacquired over the network(s) 190.

In some embodiments, the serverless compute service may enforce a global limit on the number of concurrent functions that can be used for a given client (e.g., the testing coordinator 110). For example, the coordinator 110 may be limited to a thousand concurrent functions of the compute service. However, the coordinator 110 may seek to perform canary testing at a higher transactions per second (TPS) than would be allowed by using all of the thousand functions to perform one canary test apiece. To bypass this restriction, the distributed testing may use each function execution 670A and/or 670N to execute program code to generate multiple canary tests. By using a single function at the serverless compute service to produce multiple canary tests at once (or over a small window of time), the distributed canary testing may increase the TPS of canary testing and/or reduce the number of concurrent functions executed by the serverless compute service.

In some embodiments, the coordinator 110 may determine an estimated resource usage or cost for the distributed testing. The estimated resource usage may be determined based (at least in part) on the estimated resource usage for the test clients and/or serverless compute service, the desired TPS of the testing, the storage requirements for the test artifacts, the desired duration for the testing, and so on. The coordinator 110 may present the estimated resource usage or cost to the user. In some embodiments, the coordinator 110 may determine a configuration for the distributed testing based (at least in part) on optimizing the resource usage estimate or cost estimate. For example, if the serverless compute service is capable of producing the desired TPS at a lower resource usage than a fleet of dedicated test hosts, then the coordinator 110 may determine and/or recommend a testing configuration from a set of candidate configurations that uses the serverless compute service as the compute engine, as discussed with reference to FIG. 6.

Illustrative Computer System

In at least some embodiments, a computer system that implements a portion or all of one or more of the technologies described herein may include a computer system that includes or is configured to access one or more computer-readable media. FIG. 7 illustrates such a computing device 700, according to some embodiments. In the illustrated embodiment, computing device 700 includes one or more processors 710A-710N coupled to a system memory 720 via an input/output (I/O) interface 730. In one embodiment, computing device 700 further includes a network interface 740 coupled to I/O interface 730.

In various embodiments, computing device 700 may be a uniprocessor system including one processor or a multiprocessor system including several processors 710A-710N (e.g., two, four, eight, or another suitable number). In one embodiment, processors 710A-710N may include any suitable processors capable of executing instructions. For example, in various embodiments, processors 710A-710N may be processors implementing any of a variety of instruction set architectures (ISAs), such as the x86, PowerPC, SPARC, or MIPS ISAs, or any other suitable ISA. In one embodiment, in multiprocessor systems, each of processors 710A-710N may commonly, but not necessarily, implement the same ISA.

In one embodiment, system memory 720 may be configured to store program instructions and data accessible by processor(s) 710A-710N. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720 as code (i.e., program instructions) 725 and data 726. In one embodiment, the memory 720 may store program instructions for implementing at least some aspects of the distributed testing system 100.

In one embodiment, I/O interface 730 may be configured to coordinate I/O traffic between processors 710A-710N, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processors 710A-710N). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In some embodiments, some or all of the functionality of I/O interface 730, such as an interface to system memory 720, may be incorporated directly into processors 710A-710N.

In one embodiment, network interface 740 may be configured to allow data to be exchanged between computing device 700 and other devices 760 attached to a network or networks 750. In various embodiments, network interface 740 may support communication via any suitable wired or wireless general data networks, such as types of Ethernet network, for example. Additionally, in some embodiments, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 700 via I/O interface 730. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 700 as system memory 720 or another type of memory. In one embodiment, a computer-readable medium may include transmission media or signals such as electrical, electromagnetic, or digital signals, conveyed via a communication medium such as a network and/or a wireless link, such as may be implemented via network interface 740. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a distributed testing system comprising one or more processors and one or more memories to store computer-executable instructions that, when executed, cause the one or more processors to:
receive, at a test client via a network, one or more test artifacts associated with testing of a software product;
store the one or more test artifacts in storage locally accessible to the test client;
perform a first test of the software product using the one or more received test artifacts retrieved from the storage locally accessible to the test client, wherein in performing the first test, the test client generates and sends a first set of one or more requests to the software product, and wherein the first test is initiated at a first point in time; and
perform a second test of the software product using the same one or more received test artifacts used to perform the first test, retrieved from the storage locally accessible to the test client, wherein in performing the second test, the test client generates and sends a second set of one or more requests to the software product, wherein the second test is initiated at a second point in time after the first point in time, wherein the same one or more received test artifacts are maintained in the storage locally accessible to the test client between the first point in time and the second point in time, and wherein the second test is initiated without the test client reacquiring the one or more test artifacts via the network.

2. The system as recited in claim 1, wherein the first test sends the first set of one or more requests to a particular programming interface associated with the software product, and wherein the first test is initiated based at least in part on a low frequency of usage of the particular programming interface by clients of the software product.

3. The system as recited in claim 1, wherein the one or more memories store additional computer-executable instructions that, when executed, cause the one or more processors to:

perform a third test of the software product using the one or more test artifacts, wherein in performing the third test, an additional test client generates and sends a third set of one or more requests to the software product, and wherein the additional test client is hosted in a different region of a provider network than the test client.

4. The system as recited in claim 1, wherein the first test represents a first execution of a function by a serverless compute service, and wherein the second test represents a second execution of the function by the serverless compute service.

5. A method, comprising:
storing, by a test client using one or more storage components, one or more software artifacts associated with testing of a software product;
initiating, by the test client, a first test of the software product using the one or more software artifacts retrieved from the one or more storage components, wherein initiating the first test comprises using the test client to send a first set of one or more requests to the software product, and wherein the first test is initiated at a first point in time; and
initiating, by the test client, a second test of the software product using the same one or more software artifacts used to initiate the first test, retrieved from the one or more storage components, wherein initiating the second test comprises using the test client to send a second set of one or more requests to the software product, wherein the second test is initiated at a second point in time, wherein the same one or more software artifacts are maintained in the one or more storage components between the first point in time and the second point in time, and wherein the second test is initiated without the test client reacquiring the one or more software artifacts.

6. The method as recited in claim 5, further comprising:
prior to storing the one or more software artifacts using the one or more storage components, receiving the one or more software artifacts at the test client via a network.

7. The method as recited in claim 5, wherein the first point in time and the second point in time are determined according to a testing schedule, and wherein a plurality of additional tests are performed according to the testing schedule and using the one or more software artifacts retrieved from the one or more storage components until testing is discontinued.

8. The method as recited in claim 5, wherein the first test sends the first set of one or more requests to a particular programming interface associated with the software product, and wherein the first test is initiated based at least in part on a low frequency of usage of the particular programming interface by clients of the software product.

9. The method as recited in claim 5, further comprising:
initiating, by an additional test client, a third test of the software product using the one or more software artifacts, wherein initiating the third test comprises using the additional test client to generate and send a third set of one or more requests to the software product, and wherein the additional test client is hosted in a different region of a provider network than the test client.

10. The method as recited in claim 5, wherein the first test represents a first execution of a function by a serverless compute service, and wherein the second test represents a second execution of the function by the serverless compute service.

11. The method as recited in claim 10, further comprising:
performing a plurality of tests using the first execution of the function by the serverless compute service, wherein the first execution of the function is idled between individual ones of the plurality of tests.

12. The method as recited in claim 5, further comprising:
selecting the test client and determining a configuration for the first test and the second test based at least in part on a resource usage estimate for testing the software product according to a plurality of candidate configurations.

13. One or more non-transitory computer-readable storage media storing program instructions that, when executed on or across one or more processors, perform:
storing, by a test client in a locally accessible storage, one or more software artifacts associated with testing of a software product and received by the test client via a network;
initiating, by the test client, a first test of the software product using the received one or more software artifacts retrieved from the locally accessible storage, wherein initiating the first test comprises using the test client to generate and send a first set of one or more requests to the software product, and wherein the first test is initiated at a first point in time; and
initiating, by the test client, a second test of the software product, using the same one or more received software artifacts used to initiate the first test, retrieved from the locally accessible storage, wherein initiating the second test comprises using the test client to generate and send a second set of one or more requests to the software product, wherein the second test is initiated at a second point in time, wherein the same one or more received software artifacts are maintained in the locally accessible storage between the first point in time and the second point in time, and wherein the second test is initiated without the test client reacquiring the one or more software artifacts via the network.

14. The one or more non-transitory computer-readable storage media as recited in claim 13, wherein the first point in time and the second point in time are determined according to a testing schedule, wherein the one or more software artifacts comprise the testing schedule, and wherein a plurality of additional tests are performed according to the testing schedule and using the one or more software artifacts retrieved from the locally accessible storage until testing is discontinued.

15. The one or more non-transitory computer-readable storage media as recited in claim 13, wherein the first test sends the first set of one or more requests to a particular programming interface associated with the software product, and wherein the first test is initiated based at least in part on a low frequency of usage of the particular programming interface by clients of the software product.

16. The one or more non-transitory computer-readable storage media as recited in claim 13, further comprising additional program instructions that, when executed on or across the one or more processors, perform:
initiating, by an additional test client, a third test of the software product using the one or more software artifacts, wherein initiating the third test comprises using the additional test client to generate and send a third set of one or more requests to the software product, and wherein the additional test client is hosted in a different region of a provider network than the test client.

17. The one or more non-transitory computer-readable storage media as recited in claim 13, wherein the first test represents a first execution of a function by a serverless compute service, and wherein the second test represents a second execution of the function by the serverless compute service.

18. The one or more non-transitory computer-readable storage media as recited in claim 17, further comprising additional program instructions that, when executed on or across the one or more processors, perform:
   performing a plurality of tests using the first execution of the function by the serverless compute service, wherein the first execution of the function is idled between individual ones of the plurality of tests.

19. The one or more non-transitory computer-readable storage media as recited in claim 13, further comprising additional program instructions that, when executed on or across the one or more processors, perform:
   generating an alarm associated with the software product based at least in part on the first test or the second test.

\* \* \* \* \*